United States Patent
Solvang et al.

(10) Patent No.: US 9,012,342 B2
(45) Date of Patent: Apr. 21, 2015

(54) MELT COMPOSITION FOR THE PRODUCTION OF MAN-MADE VITREOUS FIBRES

(71) Applicant: Rockwool International AS, Hedehusene (DK)

(72) Inventors: Mette Solvang, Roskilde (DK); Svend Grove-Rasmussen, Herslev (DK); Mathilde Rosendahl Foldschack, Lynge (DK)

(73) Assignee: Rockwool International A/S, Hedehusene (DK)

( * ) Notice: Subject to any disclaimer, the term of this patent is extended or adjusted under 35 U.S.C. 154(b) by 0 days.

(21) Appl. No.: 14/122,911

(22) PCT Filed: Oct. 12, 2012

(86) PCT No.: PCT/EP2012/070344
§ 371 (c)(1),
(2) Date: Nov. 27, 2013

(87) PCT Pub. No.: WO2013/087251
PCT Pub. Date: Jun. 20, 2013

(65) Prior Publication Data
US 2014/0228195 A1    Aug. 14, 2014

(30) Foreign Application Priority Data
Dec. 16, 2011 (EP) .................................... 11193988

(51) Int. Cl.
| | | |
|---|---|---|
| C03C 13/00 | (2006.01) | |
| C03C 13/06 | (2006.01) | |
| C03C 3/087 | (2006.01) | |
| C03B 5/02 | (2006.01) | |
| C03B 37/04 | (2006.01) | |

(52) U.S. Cl.
CPC .................. *C03C 13/00* (2013.01); *C03C 3/087* (2013.01); *C03C 13/06* (2013.01); *C03B 5/025* (2013.01); *C03B 37/04* (2013.01)

(58) Field of Classification Search
CPC ........ C03C 13/00; C03C 13/06; C03C 3/087; C03B 5/255; C03B 5/027; C03B 5/2356; C03B 37/04

USPC .......... 501/35, 36, 70; 65/134.1, 135.6, 135.7
See application file for complete search history.

(56) References Cited

U.S. PATENT DOCUMENTS

| | | | |
|---|---|---|---|
| 3,159,475 A | 12/1964 | Chen et at. | |
| 5,932,500 A * | 8/1999 | Jensen et al. | 501/36 |
| 5,935,886 A | 8/1999 | Jensen et al. | |
| 6,156,683 A * | 12/2000 | Grove-Rasmussen et al. | 501/35 |
| 6,346,494 B1 * | 2/2002 | Jensen et al. | 501/36 |
| 6,698,245 B1 | 3/2004 | Christensen et al. | |
| 6,949,483 B2 * | 9/2005 | Jensen et al. | 501/35 |
| 6,998,361 B2 * | 2/2006 | Lewis | 501/36 |
| 7,807,594 B2 * | 10/2010 | Leed | 501/36 |
| 2011/0172077 A1 * | 7/2011 | Lewis | 501/38 |

FOREIGN PATENT DOCUMENTS

| | | |
|---|---|---|
| EP | 1032542 | 3/2000 |
| EP | 1667939 | 4/2005 |
| GB | 1559117 | 1/1980 |
| WO | 9501941 | 1/1995 |
| WO | 9908971 | 2/1999 |
| WO | 0073233 | 12/2000 |
| WO | 2011006875 | 1/2011 |

* cited by examiner

*Primary Examiner* — Anthony J Green
*Assistant Examiner* — Elizabeth A Bolden
(74) *Attorney, Agent, or Firm* — Tarolli, Sundheim, Covell & Tummino LLP

(57) ABSTRACT

The invention relates to a melt composition for the production of man-made vitreous fibers and man-made vitreous fibers comprising the following oxides, by weight of composition:

| | |
|---|---|
| $SiO_2$ | 39-43 weight % |
| $Al_2O_3$ | 20-23 weight % |
| $TiO_2$ | up to 1.5 weight % |
| $Fe_2O_3$ | 5-9 weight %, preferably 5-8 weight % |
| CaO | 8-18 weight % |
| MgO | 5-7 weight % |
| $Na_2O$ | up to 10 weight %, preferably 2-7 weight % |
| $K_2O$ | up to 10 weight %, preferably 3-7 weight % |
| $P_2O_5$ | up to 2% |
| MnO | up to 2% |
| $R_2O$ | up to 10 weight % | wherein the proportion of Fe(2+) is greater than 80% based on total Fe and is preferably at least 90%, more preferably at least 95% and most preferably at least 97% based on total Fe.

24 Claims, 1 Drawing Sheet

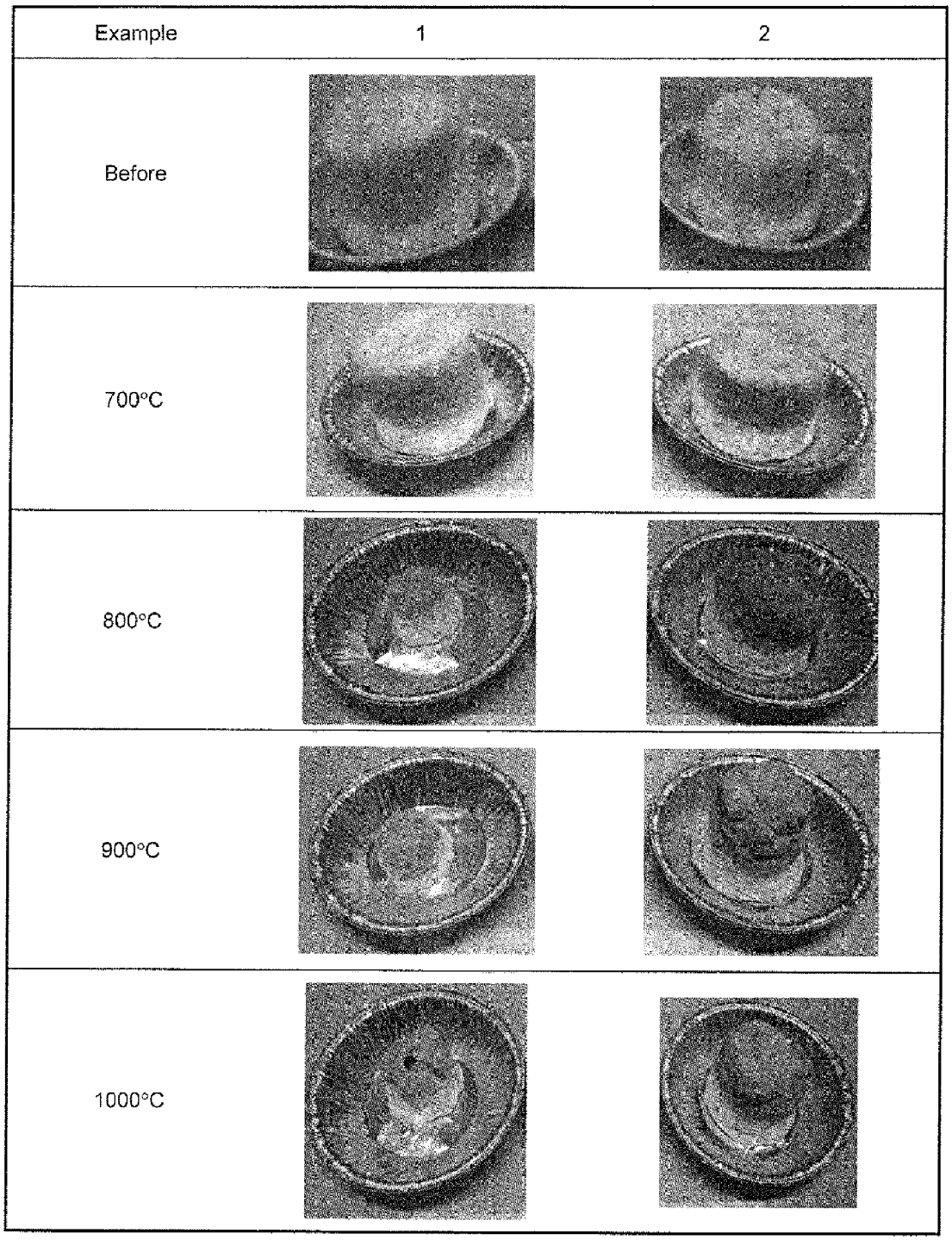

MELT COMPOSITION FOR THE PRODUCTION OF MAN-MADE VITREOUS FIBRES

FIELD OF THE INVENTION

This invention relates to a melt composition for the production of man-made vitreous fibers (MMVF). The invention also relates to a method of forming man-made vitreous fibers and a method for the formation of a melt composition.

BACKGROUND OF THE INVENTION

It is well known to produce man-made vitreous fibers, often described as mineral fibers, by providing a charge of mineral material, melting the charge in a furnace and fiberising the resulting melt to form fibers. The fibers can be used for a variety of purposes, including heat and sound insulation, fire protection, growth substrates, brake linings and vibration control.

The final composition of the fibers is generally expressed in oxides of elements contained in the fibers and it is well established that the composition of the charge of the mineral material, and hence the composition of the melt and the final fibers, can influence use properties of the final fibers.

When formulating a composition for the production of man-made vitreous fibers, it is important to consider not only the properties of the final fibers, but also the melting process, the properties of the melt, and the impact of those properties on the fiberisation process.

The invention relates to man-made vitreous fibers of the stone wool type.

Conventionally, stone wool fibers are fiberized using an external centrifugal process, for example, by use of a cascade spinner. In U.S. Pat. No. 3,159,475 Chen et al. describe such process in general. GB 1,559,117 represents a more extended description. In this type of process, a mineral melt is supplied to the surface of a set of fiberising rotors, which operates in combination with a cold stripping air for fibre drawing to throw off the mineral melt in the form of fibers. The fibers are then carried in an air-flow and collected. A binder is usually applied to the formed fibers and this contributes to the coherence of a finally formed web, which is often generated by consolidation, compression and curing. In some cases, however, no binder is used and the mineral fibers are collected as loose mineral wool.

An alternative fiberisation method is the spinning cup process, which is often referred to as internal centrifugation. In this process, a melt is fiberised by pressing the melt through holes in a spinning cup wall by rotation at high speed to form primary filaments, which then are attenuated to the final fibers by use of a 1300-1500° C. hot air from a burner with excess of oxygen from the combustion. The fibers are subsequently carried in a major air-flow and then collected on a conveyor belt and carried away for further processing to form a man-made vitreous fibre product. The spinning cup process tends to produce man-made vitreous fibre products containing a very low level of unfiberized material, as compared with external centrifugation methods. An additional advantage is that, when collected as a web, the fibers tend to be oriented in the plane of the collector to a greater extent than with external centrifugation methods, which improves the thermal insulation properties of the product. The level of thermal insulation provided is often expressed as a lambda value ($\lambda$) (units mW/m·K), which is a measure of the thermal conductivity of the insulation material.

Traditionally, however, internal centrifugal fiberisation processes have only widely been used for fiberising glass wool, which is relatively rich in alkali metal oxides (especially sodium oxide), has a high silica content, low alumina content and includes boron oxide. This traditional glass wool melt has, at reasonably low temperatures (950-1100° C.), all the properties required for the spinning cup method. Traditional stone wool melts, on the other hand, have low silica content, high alumina content and less rich alkali content. These stone wool melt compositions have a significantly higher liquidus temperature than glass wool melts.

For fiberisation in a spinning cup, it is important that the temperature of the melt arriving at the perforated belt of the spinning cup is above the liquidus temperature of the melt composition. This is to avoid crystallisation in the cup during processing. Therefore, in order to process a normal stone wool melt in a spinning cup, it is necessary to fiberize the melt at a higher temperature than glass wool melts. The properties of many stone wool melts at such temperatures are often unsuitable for fiberisation in a spinning cup.

The temperature for the fiberisation process in a spinning cup is often limited between 1150-1220° C., this from both a cost and a construction material point of view. The melt properties of many stone wool melts are often unsuitable for fiberisation in a spinning cup at such temperatures.

Standard stone wool melts can, depending on the melting method, contain significant impurities of metallic iron (Fe(0)). Metallic iron can block the holes in the spinning cup and can also cause corrosion of the spinning cup, increasing the frequency with which the cup needs to be serviced or replaced.

In addition to the properties of a melt like viscosity and liquidus temperature, the properties of the resulting fibers also need to be considered. Of these properties, bio-solubility and high temperature stability are of particular importance.

In recent years, bio-solubility has been added to the criteria that man-made vitreous fibers must meet. That is, the fibers must be able to dissolve rapidly in a physiological medium. For stone wool fibers, the biosolubility relates to the physiological environment in the macrophages in the lungs. It is, therefore, important that there is rapid dissolution at pH 4.5, with the aim of preventing any potential adverse effects from the inhalation of fine fibers.

High temperature stability is also a highly desirable property in stone wool fibers. This is not only in the context of man-made vitreous fibers used specifically in fire protection products, but also in the context of fibers used for thermal or acoustic insulation in buildings.

WO95/01941 describes cupola furnace melts intended for being fiberised in a spinning cup. Whilst the melt has a suitable viscosity and liquidus temperature for use in an internal fiberisation process, the fibers produced have a low level of bio-solubility at pH 4.5 due to the high level of silica in the melt. Furthermore, the cupola melt often contains a measurable amount of metallic iron that leads to a considerable risk of metallic iron droplets clogging up the holes of the spinning cup and thereby stopping the fiberisation process.

In EP1032542, bio-soluble and high temperature resistant fibre compositions are described. A large range for $SiO_2$ and $Al_2O_3$ is stated and the compositions must meet the requirements of $R_2O$ being at least 10 wt % and 0 wt %<MgO<15 wt %. Many of the examples have a silica content above 43 wt %, and thus only a limited portion of the examples disclosed can be assumed to be bio-soluble at pH 4.5 according to the latest authority requirements. A level of silica of over 43 wt % can be particularly disadvantageous when a high level of MgO is present. A low level of MgO as in the majority of the examples in EP1032542 can result in lower fire resistance. No melting process is specifically described in the document, and the effect of the melting process on the properties of the melt and of the fibers is not recognised.

In EP1667939, bio-soluble, high temperature resistant fibre compositions are described. At least 10% $R_2O$ ($Na_2O+K_2O$) is required in the composition, which results in high raw material cost, possible emission problems in relation to the melting process and limitations for the high temperature properties of the fibers.

Therefore, whilst previous attempts have been made to provide man-made vitreous fibers that are stable to high temperatures, bio-soluble, and can be produced by a spinning cup method, providing these features in combination whilst keeping the cost of production to a minimum has proved challenging. It would be desirable to provide further man-made vitreous fibre compositions that also meet the above criteria, or even provide an improvement, especially in terms of high temperature stability in combination with biosolubility. It would also be desirable to provide such man-made vitreous fibers in an economical manner, more flexible and efficient production processes and whilst minimising environmental problems associated with emissions.

An object of the present invention, therefore, is to provide a melt composition for the production of mineral fibers having good fire resistance. A further object is to provide a melt composition for the production of mineral fibers having good biosolubility. A further object of the invention is to provide a melt that is suitable for production by known melting technology for stone wool and that is suitable for use in a spinning cup fiberisation method. It is also an object of the invention to provide the melt at low cost. A further object is to minimise problems with emissions. Still a further object of the invention is to provide a process for producing the mineral fibers by the spinning cup method.

A further object of the invention is to provide mineral fibers that are bio-soluble, stable to high temperatures, economical to produce and that contain a low level of unfiberised material.

SUMMARY OF THE INVENTION

Accordingly, the invention provides a melt composition for the production of man-made vitreous fibers comprising the following oxides, by weight of composition:

| | |
|---|---|
| $SiO_2$ | 39-43 weight % |
| $Al_2O_3$ | 20-23 weight % |
| $TiO_2$ | up to 1.5 weight % |
| $Fe_2O_3$ | 5-9 weight % |
| CaO | 8-18 weight % |
| MgO | 5-7 weight % |
| $Na_2O$ | up to 10 weight % |
| $K_2O$ | up to 10 weight % |
| $P_2O_5$ | up to 2% |
| MnO | up to 2% |
| $R_2O$ | up to 10 weight % | wherein the proportion of Fe(2+) is greater than 80% based on total Fe and is preferably at least 90%, more preferably at least 95% and most preferably at least 97% based on total Fe.

In this specification, content of iron present in the melt or MMVF is calculated and quoted as $Fe_2O_3$. This is a standard means of quoting the amount of iron present in MMVF, a charge or a melt. Where $Fe_2O_3$ is stated, total iron content is intended. The actual weight percentage of FeO and $Fe_2O_3$ present will vary based on the iron oxide ratio and/or redox state of the melt. As an example,

| Fe(3+) | Fe(2+)/Fe(3+) = 80/20 | | | Fe(2+)/Fe(3+) = 97/3 | |
|---|---|---|---|---|---|
| $Fe_2O_3$ w/w % $Fe_2O_3$ | FeO w/w % FeO | $Fe_2O_3$ w/w % $Fe_2O_3$ | | FeO w/w % FeO | $Fe_2O_3$ w/w % $Fe_2O_3$ |
| 5.0 | 3.6 | 1.0 | | 4.4 | 0.15 |
| 6.0 | 4.3 | 1.2 | | 5.2 | 0.18 |
| 7.0 | 5.0 | 1.4 | | 6.1 | 0.21 |
| 8.0 | 5.8 | 1.6 | | 7.0 | 0.24 |

The skilled person will therefore understand that the actual weight percentage of the iron oxides present will be dependent on the ratio of Fe(2+) to Fe(3+).

In the invention, the percentage of Fe(2+) and Fe(3+) based on total Fe is measured by Mössbauer Spectroscopy as discussed below and relates to the percentage of iron in these oxidation states rather than the weight percentages based on oxides.

In a further aspect, the invention also provides man-made vitreous fibers having the composition above.

In a further aspect, the invention provides a method of forming man-made vitreous fibers by fiberising the melt composition above to form fibers and collecting the formed fibers.

In a further aspect, the invention provides a method of forming the melt composition of the invention, comprising heating and melting mineral material in a furnace and, if necessary, adjusting the oxidation state of the melt such that the proportion of Fe(2+) based on total Fe is greater than 80%.

The inventors have found that the composition of the invention has a highly desirable combination of properties. Not only do the fibers produced have good high temperature stability and good bio-solubility, it is also possible to produce them with a spinning cup method, which allows production with a low amount of unfiberised material, (often less than 2% by weight of the collected material) and results in the collected fibers lying in the plane of the collector to a greater extent. This, in turn, allows products with improved thermal insulation (lower lambda value) to be manufactured. Furthermore, these properties are achieved in spite of a low level of alkali metal oxides in the composition, resulting in economic and environmental advantages.

Melting raw materials for glass wool does not demand many considerations regarding the redox state for the melting process or during fiberisation. None of the oxides in the conventional glass wool melt composition is very sensitive to the redox state during melting. The redox state in the furnace is conventionally and most efficiently oxidising.

By contrast, when producing stone wool that is high temperature stable, the redox state of the melt is a key. It is found that the melt should contain as high a content of Fe(2+) as possible and the Fe(3+) content should be suppressed.

Preferably, the Fe(0) content should also be close to zero. The Fe(0) content can be determined by using measurements made on a magnetic analyser, such as MA-1040 manufactured by Micromeritics Instrument Corporation, Norcross, Ga., USA. When carrying out the measurements, it is preferable that the sample should have a narrow particle size range. This can be ensured, for example, by a combination of crushing and sieving. For example, a combination of crushing and sieving could be used to ensure that all particles in the sample pass through a 1.6 mm sieve, but do not pass through a 1 mm sieve. Alternatively, the sample can be crushed so that all of the particles pass through a 125 μm sieve.

As a person skilled in the art of magnetic analysis will be aware, when measuring low levels of metallic iron, the quantity of both Fe(II) and Fe(III) present, due to their paramagnetic nature, can have an effect on the measurement for the level of Fe(0) read from the magnetic analyser. This is due to the fact that the magnetic analyser measures a response which includes the contribution of ferromagnetism, ferrimagnetism and the smaller contributions of paramagnetism and diamagnetism.

Therefore, in the context of the invention, even when no Fe(0) is present, the measured level of Fe(0) will usually be non-zero, due to the required presence of Fe(II) in the composition. However, in the context of compositions comprising from 5-9% by weight iron (measured as $Fe_2O_3$) and wherein the proportion of Fe(II) is greater than 80% based on total Fe, as required in the invention, certain preferred measured values read from the magnetic analyser have been found to be indicative of advantageously low levels of Fe(0) in the composition.

Preferably, the reading or measured value for Fe(0) content, measured using a magnetic analyser is less than 900 ppm, preferably less than 800 ppm, more preferably less than 600 ppm, more preferably less than 500 ppm and most preferably less than 350 ppm. These values for the magnetic analyser reading have been found to correspond to compositions with an actual level of Fe(0) that is essentially zero, or at least sufficiently low for the composition to be used to form fibers using a spinning cup. As discussed above, the value of the reading can be the result, partially, or even entirely, of the paramagnetic contribution of Fe(II) and Fe(III).

BRIEF DESCRIPTION OF THE DRAWINGS

FIG. 1 is a table showing the fibers in accordance with the present invention at various temperatures.

DETAILED DESCRIPTION OF THE INVENTION

When producing stone wool melt for cup spinning it is important to tailor the melting process very carefully. Consequently, the redox state must be considered during the melting of raw materials and fiberisation of stone wool melts. This includes consideration of factors such as the choice of raw materials, melting processing, fiberisation processing and finally the properties of the fibers and final products. The basic reason for this is that the element Fe is very sensitive to the redox state during melting and plays an important role for the melting conditions, the melt rheology, the fiberisation and the final fibre properties.

Silica and alumina are important network formers in the melt. The amount of silica present in particular helps to ensure that the viscosity of the melt is suitable for fibre formation in a spinning cup method. The amount of alumina present in particular helps to ensure that the formed fibers are bio-soluble.

According to the invention, the content of $SiO_2$ in the melt and fibre composition is in the range 39 to 43 weight % based on the composition. Preferably, the level of $SiO_2$ is in the range from 39 to 42.5 weight %, more preferably in the range from 40 to 42 weight %.

The level of $Al_2O_3$ is in the range 20 to 23 weight %. Preferably it is in the range from 20 to 22.5 weight %. This level, when combined with the levels of other oxides according to the invention, has been found to provide an optimum combination of properties in terms of bio-solubility of fibers and liquidus temperature.

The fibers and melt can contain $TiO_2$ at a level up to 1.5%. A higher level of $TiO_2$ has been found to have a negative effect on the bio-solubility of the fibers. Preferably, the composition contains from 0.4 to 1 weight % $TiO_2$, more preferably from 0.4 to 0.8 weight %.

The fibers and melt contain from 5 to 9 weight % $Fe_2O_3$. Preferably the level of $Fe_2O_3$ is 5 to 8 weight %. This level of iron has, in combination with MgO at the level of 5-7 weight %, been found to provide fibers with good high temperature stability.

The level of iron present in each oxidation state is expressed as a percentage of Fe(3+), Fe(2+) and Fe(0), based on the total iron present. The percentage is measured using Mössbauer spectroscopy as discussed below. The percentage of Fe(2+) and Fe(3+) present will vary based on redox state of the melt.

Good fire resistance properties and a low liquidus temperature are associated with a high level of ferrous iron and low level of ferric iron in combination MgO at the level of 5-7 weight %. According to the present invention, therefore, more than 80% of the total iron is present as Fe(2+). Preferably at least 90%, more preferably at least 95%, and most preferably 97% of the total iron is present as Fe(2+).

The proportion of Fe(3+) based on total Fe in the composition is preferably less than 20%, preferably less than 10%, more preferably less than 5% and most preferably less than 3%.

The high concentration of Fe(2+) also reduces the liquidus temperature of the melt composition relative to an oxidised melt composition, where the main portion of the iron oxide is found in the form Fe(3+). This contributes to the melt's suitability for use in an internal centrifugation method.

The amount of Fe(2+) and Fe(3+) can be determined using Mössbauer Spectroscopy as described in the "Ferric/Ferrous Ratio in Basalt Melt at Different Oxygen Pressures", Helgason et al., Hyperfine Interact., 45 (1989) pp 287-294.

The level of metallic iron Fe(0) can also be determined using Mössbauer Spectroscopy as described in this reference, when the concentration is high enough, i.e. above a relatively high threshold value. In relation to the invention, the level of metallic iron in the fibers and in the melt composition is generally at a level so low as to be undetectable using this method.

It has been found that the presence of metallic iron, i.e. Fe(0), can block the holes and cause corrosion of the spinning cup during the fiberisation process and therefore reduce its working lifetime. In commercial practice, this will increase production and maintenance costs and reduce profitability. Consequently it is highly advantageous that the production method according to the invention results in a melt (the melt feed to the spinner) which is without significant amounts of metallic iron. Preferably, reading for the level of Fe(0) in the melt measured, as discussed above, using a magnetic analyser, such as MA-1040 manufactured by Micromeritics Instrument Corporation, Norcross, Ga., USA, is less than 900 ppm, preferably less than 800 ppm, more preferably less than 600 ppm, more preferably less than 500 ppm and most preferably less than 350 ppm. As discussed above, these values for the magnetic analyser reading have been found to correspond to compositions with an actual level of Fe(0) that is essentially zero, or at least sufficiently low for the composition to be used to form fibers using a spinning cup.

The level of Fe(0) can also be examined by use of microwaves to determine the dielectric properties of the melt or the produced fibers.

Preferably, the proportion Fe(0) based on total Fe in the melt and in the man-made vitreous fibers is zero, or at least so low that examination of the dielectric properties of the fibers result in a loss factor $\in''$ less than 0.02, preferably less than 0.01. $\in''$ is the loss factor and is measured using microwaves of the given frequency, in this case 2450 Hz. This low value of loss factor signifies the absence of metallic iron in the melt and in the mineral fibers, or at least a very low level, which does not disturb the spinning process or reduce the lifetime of the spinning cup.

The higher the level of MgO, in combination with the Fe(2+) level required in the invention, the better the fire properties of the fibers and of the products made using the fibers, but a disadvantage can be increased liquidus temperature if the MgO level is too high. According to the present invention, the level of MgO in the composition is in the range 5 to 7 weight %, preferably from 5.5 to 6.0 weight %. This provides good high temperature stability in combination with the Fe(2+) content required according to the invention. A low liquidus temperature is achieved by combining the required level of MgO with the percentages of other oxides present in the composition and the redox state characterised by the level of Fe(2+) required in the invention.

The amount of CaO according to the invention is 8 to 18 weight %, preferably 10 to 16 weight %, and more preferably 13 to 16 weight %. This level of CaO is advantageous for the bio-solubility of the fibers and for a low liquidus temperature.

The combined amount ($R_2O$) of alkali metal ($Na_2O$ and $K_2O$) is up to 10 weight %, preferably up to less than 10% by weight, more preferably from 6 to 9.5% by weight. Where present, the alkali helps to decrease the liquidus temperature. It has been discovered that a level of alkali of 10% or less can be tolerated by combining this with the levels of calcium and iron oxides required in the invention. In this way, the cost of raw materials can be kept to a minimum whilst maintaining a liquidus temperature that is acceptable for internal centrifugation.

It is further believed that the limited amounts of $Na_2O$ and $K_2O$ support the excellent high temperature properties of the fibers, whereas higher amounts tend to adversely affect the high temperature properties for the fibers according to the invention.

According to the invention, it is preferred that the level of $Na_2O$ is from 2 to 7 weight %. It is also preferred that the level of $K_2O$ is from 3 to 7 weight %.

The ratio of $K_2O$ to $Na_2O$ has also been found to affect the properties of the melt. It has been found that the optimum viscosity is achieved with a ratio of from 1:2 to 4:1, preferably from 1:1 to 3:1. Ratios in this range have been found to be associated with a reduced viscosity in the melt.

One advantage of the invention is that the fibers have a good biosolubility at pH 4.5. This biosolubility can be determined by known means, for example in vitro in terms of a dissolution rate at acidic pH (Gamble solution at about pH 4.5). Alternatively the biosolubility may be determined in vivo in a known manner.

The man-made vitreous fibers of the invention have excellent fire resistance at 1000° C. The man-made vitreous fibers can be made into a product for use in any of the conventional applications for man-made vitreous fibers, such as sound or thermal insulation, fire protection, growth substrates, brake linings and vibration control. The product may be used in high temperature environments, such as at least 400° C., and up to 1000° C.

One of the main advantages of the fibers of the invention is that they can be produced by a spinning cup process, as they are in the method of the invention. The method of producing man-made vitreous fibers according to the invention involves fiberising a melt composition of the invention and collecting the formed fibers, wherein the fiberisation is by a spinning cup method.

Using this method, there is a lower amount of unfiberised mineral material (shots) present in the resulting man-made vitreous fibre product as compared with a product produced using cascade spinning. Therefore, according to the invention, preferably, there is less than 4% by weight unfiberised mineral material present in a man-made vitreous fibre product formed from the fibers of the invention or by the method of the invention. More preferably, there is less than 2% and most preferably less than 1% by weight unfiberised mineral material present in the man-made vitreous fibre product. Unfiberised mineral material is defined as solid charge with a particle diameter greater than 63 micrometers.

Furthermore, mineral fibers produced by a spinning cup method are laid down on the collector belt in such a way that they are oriented parallel to the plane of the collector to a greater extent than fibers produced using a cascade spinner. This allows insulation products to be produced in which the fibers are oriented parallel to the surface to be insulated to a greater extent than in products produced with a cascade spinner method. The lambda value of the products of the invention can, therefore, be less than 40 mW/m·K, often less than 36 mW/m·K, possibly less than 33 mW/m·K, and even less than 31 mW/m·K.

The melt composition of the invention can be produced by heating and melting mineral material in a furnace and, if necessary, adjusting the oxidation state of the melt such that the proportion of Fe(2+) based on total Fe is greater than 80%, preferably greater than 90%, more preferably greater than 95%, most preferably greater than 97%.

It is known that fibers made by the cascade spinning process have the same ratio of Fe(2+) to total Fe as measured in the melt composition poured on the spinning wheel. For the cascade spinning process cold air is the medium for fibre drawing.

The spinning cup process is completely different to the cascade spinning as the fibers are attenuated by hot air with temperatures around 1300-1500° C. The attenuation air has excess of oxygen and might be expected to oxidise the basic filaments, which are extruded out of the holes from the spinning cup for further attenuation in the hot gas.

It is surprising, however, that the hot oxidising attenuation gas during the fibre attenuation along the outer wall side of the spinning cup process does not oxidise the fibers and that the redox state in the final fibers is kept as in the melt.

Examinations of the melt and the fibers show identical ratios of Fe(2+) to total Fe.

The raw materials used as the mineral material can be selected from a variety of sources as is known. These include basalt, diabase, nepheline syenite, glass cullet, bauxite, quartz sand, limestone, rasorite, sodium tetraborate, dolomite, soda, olivine sands, phonolite, K-feldspar, garnet sand and potash.

In some embodiments, the mineral material is melted in such a way that a melt composition has the required proportion of Fe(2+) from the outset. The invention also encompasses, however, methods in which the melting method does not automatically yield the required proportion of Fe(2+). In these embodiments, the redox state of the mineral melt produced initially as bulk melt must be adjusted before the bushing, where the melt is fed or poured to the spinning cup(s) such that the proportion of Fe(2+) based on total Fe is greater than 80%.

In one embodiment, the furnace is an electric furnace, preferably a submerged arc furnace, using graphite electrodes. Preferably, the graphite electrodes are in contact with the mineral material. The graphite electrodes generally become at least partially submerged in the melt. Various types of graphite electrodes are known and can be used in a submerged arc furnace. Preferably the graphite electrodes in the submerged arc furnace are preformed solid graphite electrodes. The advantage of using graphite electrodes is that they increase the level of Fe(2+) present in the melt which results in MMVF which have a high resistance to temperatures up to 1000° C.

In this embodiment, the melt composition produced generally has the required proportion of Fe(2+) from the outset. Therefore, it is generally not required to adjust the redox state of the melt in a subsequent step. It may, however, in some cases be advantageous to provide measures for maintaining the redox state of the melt from the furnace until spinning thereof.

It has been found that using a submerged arc furnace to produce the melt composition in combination with fiberising the melt by a spinning cup process is particularly suitable for forming the fibers of the invention. When formed by this process, the fibers have particularly good fire resistance and comprise low levels of shot. The high temperature stability is believed to be associated with the fact that the resulting fibers have a high content of iron in the form of Fe(2+) in combination with the MgO content specified according to the invention. The redox condition in the process of providing the melt, combined with the use of a spinning cup process, influences the amount of each of the possible iron oxides in the bulk melt and final properties of the MMVF produced from the melt We find that, with the use of graphite electrodes in particular, bulk melts can be produced which are significantly improved in terms of homogeneity and level of impurities such as drops of metallic iron having the size of a few microns, and which are wholly suited for fiberisation via the spinning cup process, in comparison with conventional cupola melting methods. This appears to be the case even if the bulk chemistry in terms of concentration of Fe(2+) based on total Fe is the same. This is despite the fact that the submerged arc furnace melting process, like the cupola, generates minor amounts of metallic iron (so-called "pig iron") which accumulates in the furnace. This accumulated metallic iron, however, surprisingly does not appear in the melt leaving the submerged arc furnace outlet, neither in the feeder channel (also known as forehearth) nor in the formed fibers from the process. If any, the level of metallic iron, Fe(0) is so low that it does not disturb the fiberisation process.

Any Fe(0) that might be present is undetectable using Mössbauer spectroscopy (and usually very low as indicated above) in the melt fed to the spinning cups and in the final product for submerged arc furnaces, whereas this is not the case in relation to melts from a cupola furnace.

We find that fibers made from a melt produced from a conventional coke fired cupola furnace act significantly differently in relation to absorption of microwaves (dielectric properties), compared to fibers made, as preferred in the invention, from a melt produced in an electric furnace, in particular a submerged arc furnace, where the energy for melting is transferred to the melt by graphite electrodes.

Fiber slabs of MMVF—stone wool without binder—made by the same spinning method and having the same bulk chemical composition, but with their origin in different melting processes—submerged arc furnace versus coke-fired cupola furnace—have been macroscopically tested for dielectric properties by absorption of energy transferred by microwaves. In particular the "dielectric loss factor" $\in"$ was determined for the fibers. If the melt for manufacturing the stone wool fibers has been produced in a conventional coke fired cupola furnace, we find that the fibers formed have a dielectric loss factor in the range $0.05<\in"<0.07$. On the other hand, if the melt for manufacturing the MMVF has been smelted in a furnace with graphite electrodes, the fibers formed from the melt have low $\in"$. The loss factor $\in"$ was <0.02, which means that the fibers do not absorb energy from microwaves. This level of $\in"$ is essentially the same as for fibre glass or glass wool. For these two products we know that there cannot be any detectable metallic iron (as a result of the oxidising conditions in the melting process) even if there might be minor amounts of measurable $Fe_2O_3$ in the chemical composition of the glass melt.

Despite the very low dielectric "loss factor" for stone wool fibers which are produced from melts made as one of the possible embodiments by this invention, this melt still has a very high content of Fe(2+) based on total Fe.

In an alternative embodiment, the step of heating and melting of mineral material in a furnace comprises:
  suspending powdered carbonaceous fuel in preheated combustion air
and combusting the suspended carbonaceous fuel to form a flame,
  suspending particulate mineral material which has been preheated, preferably to at least 500° C., more preferably to at least 700° C., in the flame and melting the mineral material in a circulating combustion chamber and thereby forming the melt composition.

Suitable methods are described, for example, in WO 03/02469. In a preferred embodiment, hot exhaust gases are produced in the circulating combustion chamber and the method further comprises:
  separating the hot exhaust gases from the melt and collecting the melt,
  contacting the exhaust gases from the melt in a cyclone preheater under NOx-reducing conditions with the particulate mineral material which is to be melted and thereby reducing NOx in the exhaust gases and preheating the particulate material, preferably to at least 500° C., more preferably to at least 700° C., and
    providing the preheated combustion air by heat exchange of air with
  the exhaust gases from the cyclone preheater.

When this method of producing the melt is used at correctly controlled conditions regarding the redox state, generally the melt has the required proportion of Fe(2+) from the outset. It is thought that during production of a mineral melt by this process carbonaceous material is deposited on the surface of the melt, which creates the desired oxidation state in the melt. Therefore, it is generally not required to adjust the oxidation state of the melt in a subsequent step.

In another embodiment of the method according to the invention, the furnace is a conventional glass furnace or basalt melter, which can be electrically heated or often heated with a combination of electrical heating and oil and/or gas heating. Furnaces falling into this category are described in U.S. Pat. No. 6,125,658. When the furnace is a conventional glass furnace or basalt melter, usually the mineral melt does not have the desired proportion of Fe(2+) from the outset. Instead, it is required to adjust the redox state of the mineral melt such that the proportion of Fe(2+) based on total Fe is greater than 80% before the melt is fed through the feeder bushing(s) to the spinning cup(s).

The adjustment of the oxidation state of the melt can be carried out in any way such that the resulting melt composition has a proportion of Fe(2+) based on total Fe of greater than 80%, preferably at least 90%, more preferably at least 95% and most preferably at least 97%.

In one embodiment, the step of adjusting the oxidation state of the mineral melt comprises subjecting the mineral melt to an electric potential. Preferably, the electrical potential is applied with graphite electrodes. Usually the graphite electrodes are at least partially submerged in the melt. It has been found that the methods described above produce melts containing low or undetectable levels of metallic iron, which allow the melt to be fiberised in a spinning cup without encountering problems with blockage of the holes in the spinning cup.

One of the method aspects of the invention involves fiberising a melt composition of the invention by a spinning cup method to form fibers and collecting the fibers.

Before fiberising the melt, however, it can be advantageous to homogenise the melt in a refiner or in a feeder unit. This can ensure that the temperature, viscosity and chemical composition is consistent throughout the melt. In order for the melt composition to remain suitable for fiberisation by a spinning cup method, however, it is important that the redox state of the melt composition remains such that the proportion of Fe(2+) based on total Fe is greater than 80%.

The melt is fiberised using a spinning cup as known in the art. One advantage of the invention is that the melt has a low liquidus temperature $T_{liq}$. This allows the fibers to be produced by a spinning cup method at an economical temperature. It has been found that the melt that is fiberised to produce the fibers of the invention generally have a liquidus temperature of less than 1220° C. The $T_{liq}$ can be measured according to ASTM C829-81. Preferably, the melt has a liquidus temperature of less than 1220° C. More preferably the liqidus temperature of the melt is less than 1200° C. Even more preferably the liquidus temperature is less than 1180° C. Most preferably the liquidus temperature of the melt is less than 1160° C. or even less than 1150° C. The liquidus temperature is usually greater than 1100° C.

The viscosity of the melt at the liquidus temperature is generally above 100 Pa·s, preferably above 300 Pa·s, and more preferably above 600 Pa·s.

In the context of fibers produced by a spinning cup method it is particularly important to have a low liquidus temperature in order to avoid formation of crystals in the melt during spinning (and consequent risk of blocking the apertures in the spinning cup). The advantage of having a low liquidus temperature for the melt composition is thus that the fiberisation process can run at corresponding lower temperatures and therefore at lower costs—especially regarding energy for fiberising and wearing materials like hot gas burner equipment and the spinning cup material.

In the method of the invention, the melt is fiberised by the spinning cup technology (also sometimes described as internal centrifugation). The melt has a temperature at the end of a feeder channel in the range 1260-1300° C. before it is led to the spinning cup. The melt preferably cools down when it is transferred from the feeder channel to the internal parts of the spinning cup in such a way that the temperature for the melt when flowing through the perforations of the spinning cup is above the liquidus temperature of the melt. The temperature of the melt should be as low as possible to reduce wear and tear of the equipment, but high enough to avoid problems with formation of crystals in the melt during spinning (and consequent risk of blocking the apertures in the spinning cup).

The viscosity of the melt in the spinning cup is in the range of 50 to 400 Pa·s, preferably 100 to 320 Pa·s, more preferably 150 to 270 Pa·s. If the viscosity is too low, fibers of the desired thickness are not formed. If the viscosity is too high, the melt does not flow through the apertures and the spinning cup at the right pull rate, which can lead to blocking of the apertures of the spinning cup.

The melt is preferably fiberised by the spinning cup method at a temperature between 1160 and 1210° C. The viscosity of the melt is preferably in the range 100 to 320 Pa·s at the spinning temperature. Viscosity is measured according to ASTM C 965-96. These viscosity ranges mean that spinning cup processing methods can be used to provide the fibers of the invention.

Binder can be applied to the fibers and the fibers collected as a web. Where binder is applied to the fibers, it is usually selected from phenol formaldehyde binder, urea formaldehyde binder, phenol urea formaldehyde binder, melamine formaldehyde binder, condensation resins, acrylates and other latex compositions, epoxy polymers, sodium silicate and hotmelts of polyurethane, polyethylene, polypropylene and polytetrafluoroethylene polymers.

In an alternative embodiment, no binder is applied and the fibers are collected as loose mineral wool.

If any, the level of Fe(0) present in the fibers is also reflected by their dielectric properties—as tested by absorption of energy transferred by microwaves. In particular, the dielectric loss factor $\in"$ is low for fibers having no trace of metallic iron. The loss factor $\in"$ for the fibers is preferably less than 0.02, preferably >0.01, which means that the fibers do not absorb energy from microwaves. This level of $\in"$ is essentially the same as for glass wool where it is known that there is no detectable metallic iron (as a result of the oxidising conditions in the melting process) even if there might be measurable $Fe_2O_3$ in the bulk chemical composition for the glass melt.

EXAMPLES

One of the advantages of the invention is that the fibers have improved high temperature stability and bio-solubility as compared with fibers having a lower proportion of Fe(2+) and a higher proportion of Fe(3+). This advantage is demonstrated by the following example.

Fibres were produced by a spinning cup method having the following compositions expressed as a percentage by weight of oxides:

|  | Example | |
| --- | --- | --- |
|  | 1 (comparative) | 2 |
| $SiO_2$ | 41.5 | 41.4 |
| $Al_2O_3$ | 22.3 | 21.8 |
| $TiO_2$ | 0.7 | 0.4 |
| $Fe_2O_3$ | 6.0 | 6.7 |
| CaO | 14.2 | 14.9 |
| MgO | 5.3 | 5.6 |
| $Na_2O$ | 2.5 | 2.8 |
| $K_2O$ | 6.7 | 6.4 |
| $P_2O_5$ | 0.1 | <0.1 |
| MnO | <0.1 | <0.1 |
| Fe(2+)% based on total Fe | 21 | >97 |
| Kdis ng/cm²/h | >600 | >600 |

The fibers were then tested for high temperature stability and the results are shown in FIG. 1. The test for high temperature stability (sometimes also referred to as temperature resistance, fire stability or fire resistance) was performed by placing the sample in a furnace at a specific temperature and keeping the sample at the temperature for 30 min, The samples shown in FIG. 1 are placed in bowls having an outer diameter of 7.5 cm and an inner diameter of 4.2 cm.

The fibers were also tested to determine their bio-solubility in in-vitro flow tests (Gamble solution pH 4.5).

The invention claimed is:

1. A melt composition for the production of man-made vitreous fibers comprising the following oxides, by weight of composition:

| | |
|---|---|
| $SiO_2$ | 39-43 weight % |
| $Al_2O_3$ | 20-23 weight % |
| $TiO_2$ | up to 1.5 weight % |
| $Fe_2O_3$ | 5-9 weight %, |
| CaO | 8-18 weight % |
| MgO | 5-7 weight % |
| $Na_2O$ | up to 10 weight %, |
| $K_2O$ | up to 10 weight %, |
| $P_2O_5$ | up to 2% |
| MnO | up to 2% |
| $R_2O$ | up to 10 weight % | wherein the proportion of Fe(2+) is greater than 80% based on total Fe;
wherein the reading for Fe(0) content in the melt, measured using a magnetic analyser, is less than 900 ppm.

2. A melt composition according to claim 1, wherein the reading for Fe(0) content in the melt, measured using a magnetic analyser, is less than 500 ppm.

3. A method of forming man-made vitreous fibers comprising fiberising a melt composition according to claim 1 by a spinning cup method to form fibers and collecting the formed fibers.

4. A method of forming a melt composition as defined in claim 1, comprising heating and melting mineral material in a furnace to produce a mineral melt and, if necessary, adjusting the oxidation state of the melt such that the proportion of Fe(2+) based on total Fe is greater than 80%.

5. A melt composition according to claim 1, wherein the proportion of Fe(2+) is greater than at least 90% based on total Fe.

6. A melt composition according to claim 1, wherein the proportion of Fe(2+) is greater than at least 95% based on total Fe.

7. A melt composition according to claim 1, wherein the proportion of Fe(2+) is greater than at least 97% based on total Fe.

8. Man-made vitreous fibers having a composition comprising the following oxides, by weight of composition:

| | |
|---|---|
| $SiO_2$ | 39-43 weight % |
| $Al_2O_3$ | 20-23 weight % |
| $TiO_2$ | up to 1.5 weight % |
| $Fe_2O_3$ | 5-9 weight %, |
| CaO | 8-18 weight % |
| MgO | 5-7 weight % |
| $Na_2O$ | up to 10 weight %, |
| $K_2O$ | up to 10 weight %, |
| $P_2O_5$ | up to 2% |
| MnO | up to 2% |
| $R_2O$ | up to 10 weight % | wherein the proportion of Fe(2+) based on total Fe is greater than 80%;
wherein the reading for Fe(0) content in the man-made vitreous fibers, measured using a magnetic analyser, is less than 900 ppm.

9. Man-made vitreous fibers according to claim 8, wherein the dielectric loss factor ∈" of the fibers is less than 0.02.

10. Man-made vitreous fibers according to claim 8, wherein the reading for Fe(0) content in the man-made vitreous fibers, measured using a magnetic analyser, is less than 500 ppm.

11. Man-made vitreous fibers according to claim 8, wherein the ratio of $K_2O$ to $Na_2O$ calculated by weight of oxides is from 1:2 to 4:1.

12. Man-made vitreous fibers according to claim 8, wherein the fibers are formed by a spinning cup method.

13. A man-made vitreous fibre product comprising man-made vitreous fibers according to claim 8 and binder.

14. A man-made vitreous fibre product according to claim 13, wherein the product comprises less than 4% shot.

15. A melt composition according to claim 8, wherein the proportion of Fe(2+) is greater than at least 90% based on total Fe.

16. A melt composition according to claim 8, wherein the proportion of Fe(2+) is greater than at least 95% based on total Fe.

17. A melt composition according to claim 8, wherein the proportion of Fe(2+) is greater than at least 97% based on total Fe.

18. A method of forming a melt composition, the method comprising the steps of:
heating and melting mineral material in a furnace to produce a mineral melt; and
adjusting, if necessary, the oxidation state of the melt such that the proportion of Fe(2+) based on total Fe is greater than 80%;
wherein the melt composition comprises the following oxides, by weight of composition:

| | |
|---|---|
| $SiO_2$ | 39-43 weight % |
| $Al_2O_3$ | 20-23 weight % |
| $TiO_2$ | up to 1.5 weight % |
| $Fe_2O_3$ | 5-9 weight % |
| CaO | 8-18 weight % |
| MgO | 5-7 weight % |
| $Na_2O$ | up to 10 weight % |
| $K_2O$ | up to 10 weight % |
| $P_2O_5$ | up to 2% |
| MnO | up to 2% |
| $R_2O$ | up to 10 weight % | wherein the reading for Fe(0) content in the man-made vitreous fibers, measured using a magnetic analyser, is less than 900 ppm;
wherein the oxidation state of the melt is adjusted by subjecting the melt to an electrical potential.

19. A method according to claim 18, wherein the oxidation state of the melt is adjusted by subjecting the melt to an electrical potential using graphite electrodes.

20. A method of forming a melt composition, the method comprising the steps of:
heating and melting mineral material in a furnace to produce a mineral melt; and
adjusting, if necessary, the oxidation state of the melt such that the proportion of Fe(2+) based on total Fe is greater than 80%;
wherein the melt composition comprises the following oxides, by weight of composition:

| | |
|---|---|
| $SiO_2$ | 39-43 weight % |
| $Al_2O_3$ | 20-23 weight % |

| | |
|---|---|
| TiO$_2$ | up to 1.5 weight % |
| Fe$_2$O$_3$ | 5-9 weight % |
| CaO | 8-18 weight % |
| MgO | 5-7 weight % |
| Na$_2$O | up to 10 weight % |
| K$_2$O | up to 10 weight % |
| P$_2$O$_5$ | up to 2% |
| MnO | up to 2% |
| R$_2$O | up to 10 weight % | wherein the reading for Fe(0) content in the man-made vitreous fibers, measured using a magnetic analyser, is less than 900 ppm;

wherein the furnace is a submerged arc furnace.

21. A method according to claim 20, wherein the furnace is a submerged arc furnace using graphite electrodes.

22. A method of forming a melt composition, the method comprising the steps of:

heating and melting mineral material in a furnace to produce a mineral melt; and adjusting, if necessary, the oxidation state of the melt such that the proportion of Fe(2+) based on total Fe is greater than 80%;

wherein the melt composition comprises the following oxides, by weight of composition:

| | |
|---|---|
| SiO$_2$ | 39-43 weight % |
| Al$_2$O$_3$ | 20-23 weight % |
| TiO$_2$ | up to 1.5 weight % |
| Fe$_2$O$_3$ | 5-9 weight % |
| CaO | 8-18 weight % |
| MgO | 5-7 weight % |
| Na$_2$O | up to 10 weight % |
| K$_2$O | up to 10 weight % |
| P$_2$O$_5$ | up to 2% |
| MnO | up to 2% |
| R$_2$O | up to 10 weight % | wherein the reading for Fe(0) content in the man-made vitreous fibers, measured using a magnetic analyser, is less than 900 ppm;

wherein the step of heating and melting of mineral material in a furnace comprises:

suspending powdered carbonaceous fuel in preheated combustion air and combusting the suspended carbonaceous fuel to form a flame, suspending particulate mineral material, which has been preheated in the flame, and melting the mineral material in a circulating combustion chamber and thereby forming the melt composition.

23. A method according to claim 22, wherein the particulate material has been preheated to at least 500° C.

24. A method according to claim 22, wherein the particulate material has been preheated to at least 700° C.

* * * * *